Sept. 18, 1956　　　H. G. INHOFER　　　2,763,072
ROTARY SNOWPLOW
Filed March 1, 1952

INVENTOR
Harold G. Inhofer
BY Williamson, Williamson, Schroeder & Adams
ATTORNEYS

United States Patent Office 2,763,072
Patented Sept. 18, 1956

2,763,072

ROTARY SNOWPLOW

Harold G. Inhofer, Fairfax, Minn.

Application March 1, 1952, Serial No. 274,388

1 Claim. (Cl. 37—43)

This invention relates generally to a snow plow of the rotary power-driven type adapted to be mounted on the front end of a farm tractor or the like and driven from the power take-off thereof.

A large number of power-driven rotary type snow plows have previously been constructed and many of these work reasonably well under most conditions. However, when the snow becomes wet and sticky or is hard and crusted, these conventional plows tend to clog and become substantially inoperative.

It is therefore an object of my invention to provide a rotary type power-driven snow plow adapted to be mounted on the front end of an automotive vehicle such as a farm tractor or the like and having at least one power-driven rotor with a plurality of snow engaging and throwing scoops, each scoop having a generally curved cross-sectional shape and constructed so that slow rotation thereof works in close cooperation with the forward motion of the tractor to produce a transverse scouring action on the curved snow-engaging surface of the rotor scoops.

More specifically, it is an object to provide a power-driven rotary type snow plow having at least one relatively slow speed rotor mounted for rotation on an axis disposed generally longitudinally of the direction of travel of the plow and having a plurality of substantially radially disposed snow-engaging and throwing blades, each blade having a generally arcuately curved transverse cross-sectional shape whereby the snow entering the same will produce a scouring action transversely across the snow-engaging and throwing surface thereof to prevent clogging and whereby the speed of discharge of the snow from the scoops will be materially faster than the speed of the scoops.

It is another object of my invention to provide an embodiment wherein a pair of cooperating rotors are mounted so as to deliver discharged snow upwardly through a common discharge chute.

These and other objects and advantages of my invention will more fully appear from the following description made in connection with the accompanying drawings wherein like reference characters refer to the same or similar parts throughout the several views and in which.

Figure 1:
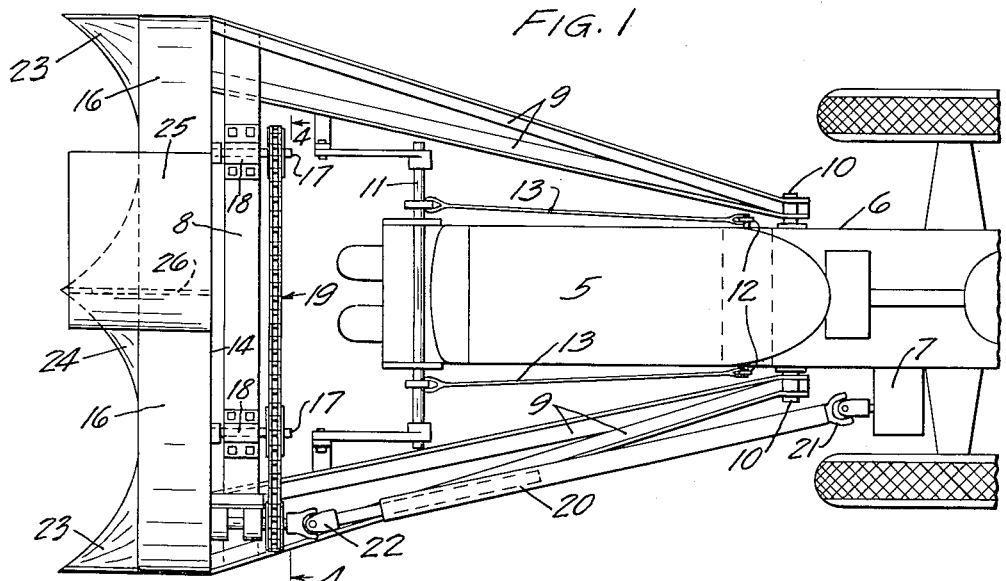
Fig. 1 is a top plan view showing an embodiment of my snow plow mounted on the front end of a conventional farm tractor.
Figure 2:
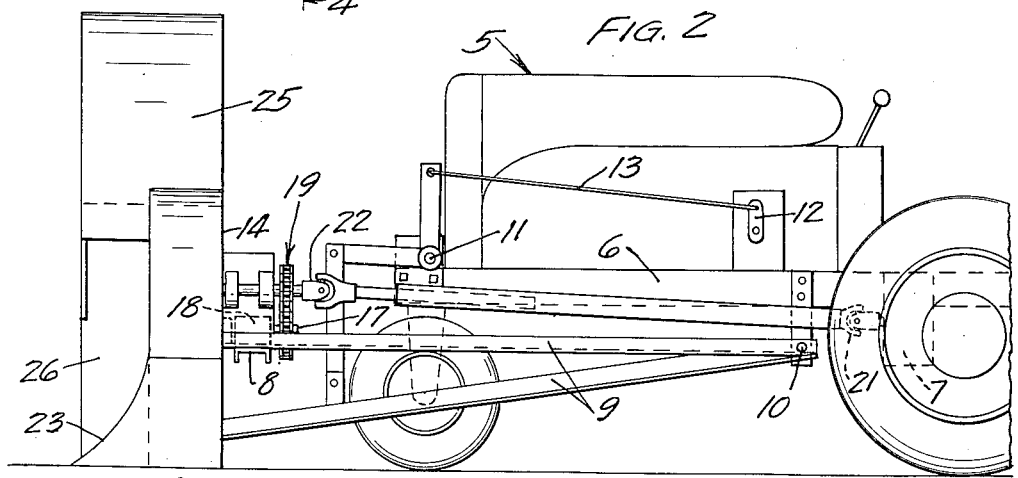
Fig. 2 is a side elevational view thereof.

As illustrated in the accompanying drawings, my snow plow is mounted on a conventional farm tractor such as the tractor 5 as best shown in Figs. 1 and 2, having a frame structure 6 and power take-off connection 7. A plow supporting frame designated as an entirety by the numeral 8 has a pair of rearwardly extending elevating booms 9 which are pivotally mounted on the tractor frame 6 as at 10. A bell crank mechanism designated as an entirety by the numeral 11 is transversely mounted across the front portion of the tractor frame 6 and permits the entire supporting structure and plow mechanism to be adjustably elevated. Suitable control levers 12 are provided for actuating the bell crank mechanism 11 and are connected thereto as by the cables 13.

A plow casing structure consisting in a backing plate 14 mounted behind each rotor 15 and having a substantially cylindrical peripheral casing 16 surrounding each rotor 15 and extending forwardly from the backing plate 14, is mounted on the supporting structures 8 and 9. The two rotors 15 are respectively mounted on a pair of drive shafts 17 which are journalled in suitable bearings 18, as best shown in Fig. 1. The two drive shafts 17 are driven by a chain and sprocket driving mechanism 19 which is connected with the power take-off 7 of the tractor as by a main drive shaft 20 having a pair of universal joints 21 and 22.

Figure 3:
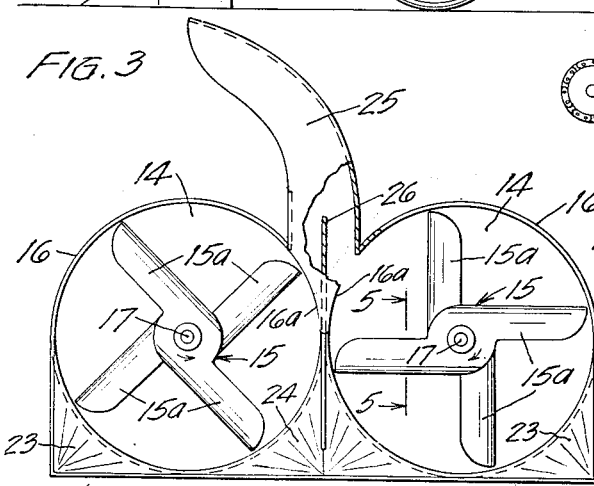
Fig. 3 is a front elevational view of the plow shown in Figs. 1 and 2.
Figure 4:
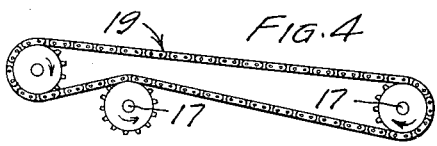
Fig. 4 is a fragmentary transverse vertical sectional view taken substantially along the line 4—4 of Fig. 1.
Figure 5:
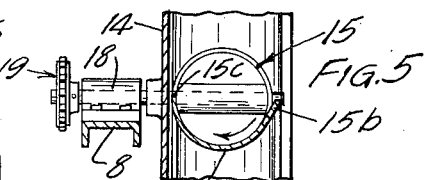
Fig. 5 is a longitudinal vertical sectional view taken substantially along the line 5—5 of Fig. 3.

Each of the rotors 15 has a plurality of scoop elements such as the four radially disposed peripherally spaced scoops 15a mounted in fixed relation on the shafts 17. As best shown in Fig. 3, the scoops of one rotor 15 are 45 deg. out of phase relative to the scoops of the other rotor 15. The major portion of each of these scoops 15a is constructed from a semi-cylindrical member. However, in the form shown, the forward edge of each of the scoops 15a is cut back a slight distance and an elongated flat surfaced plate 15b is fixed to this cut back edge and is disposed substantially tangentially to the adjacent curved portion of the scoop, as best shown in Fig. 5. Also, in the form shown, the outer front edge of this plate 15b on each of the scoops terminates adjacent a radially disposed plane extending axially through the rotor shaft 17 and through the rearwardly disposed edge 15c of the scoop. By forming these scoops with the major portion thereof having a generally circular cross-sectional shape, a transverse scouring action is produced on the snow engaged thereby and this transverse action not only materially increases the speed at which the snow is discharged from the scoops but also maintains the snow-engaging surface of each scoop substantially clean and positively prevents clogging of the snow in the scoops even when in wet snow. The combination of the action produced by slow speed rotation of the rotors and the forward motion of the plow relative to the snow engaged produces this new and highly effective scouring action.

A mold board structure consisting in a pair of forwardly extending wing members 23 and a central snow guiding structure 24 are connected at the lower peripheral portions of the cylindrical casing elements 16 as best shown in Figs. 1, 2 and 3 to guide the snow rearwardly into said casing. In the form shown, the two casing sections 16 have discharge openings 16a formed at the inner ends thereof and a discharge chute 25 is mounted above said openings 16a to collect the snow discharged therethrough. As best shown in Fig. 2, the front of the discharge chute is disposed forwardly a substantial distance from the front edge of the cylindrical casing element 16 to provide a mouth on each side of the chute of sufficient area to prevent clogging of the snow therein. A dividing partition 26 maintains a substantially tangential discharge flow of the snow upwardly into the chute 25 from which it is delivered in the usual manner along the side of the roadway being plowed or into a truck if desired.

The following is a description of the operation of my new snow plow. The tractor is driven at a speed depending upon the snow conditions and, in the form shown, the rotors 15 are rotated by the driving connection mechanism with the power take-off 7 of the tractor. The speed of rotation of the rotors is relatively slow usually ranging between 250 and 300 R. P. M., but under some conditions speeds as slow as 225 or 350 R. P. M. might be used. At this relatively slow speed of rotation, the snow is discharged from the scoops 15a with a throwing action at a speed substantially greater than the speed of travel of the snow-engaging scoops. The forwardly extending tangential blade portion 15b of each scoop 15a imparts a rearwardly directed force to the snow initially engaged thereby. By initially directing a force on the engaged snow a scouring action is produced across the arcuately curved snow-engaging surface of the scoops which is considerably more efficient in operation than would be produced by merely a semi-circular blade. Centrifugal force of course produced by the rotation of the blade about its longitudinally disposed axis imparts a radially directed force to the engaged snow. The combination of the centrifugal force with the transversely directed scouring force produced by the curved shape of each scoop and improved by the tangentially disposed forwardly extending blade portion 15b causes the snow to travel in a diagonally disposed direction across the face of the scoop. The incoming snow combines with the natural scouring action to push the snow engaged by the scoop diagonally outwardly to discharge the same at a speed substantially greater than the rate of travel of the individual scoops. The scouring action produced by the combination of forces prevents clogging of the scoops even in extremely wet snow. Also, one of the important advantages of my improved construction is the fact that the snow moves in a continuous uninterrupted path around the cylindrical housing section and is discharged upwardly through the discharge outlet openings 16a and into the chute 25.

It will be seen that I have provided a novel and highly efficient power-driven rotary snow plow operating at a relatively slow rate of speed and producing a throwing action rather than a blowing action on the engaged snow. The forward motion of the plow along the roadway being cleared combines with the curved rotor scoops to produce a transverse rearwardly directed scouring action across the snow-engaging surface of each scoop and this scouring action maintains said surface substantially clean even when the plow is being operated in wet snow. The tangentially disposed blades extending forwardly from the front edge of the cylindrical portion of each scoop imparts a rearwardly directed force on the snow when it is first engaged and thereby materially aids the transverse scouring action which prevents the blades from becoming clogged.

It will, of course, be understood that various changes may be made in the form, details and arrangement of the parts without departing from the scope of my invention which, generally stated, consists in the matter shown and described herein and set forth in the appended claim.

What I claim is:

A rotary type power driven snow plow, said plow comprising at least one power driven rotor mounted for rotation on a substantially horizontal axis, a supporting structure carrying said rotor, said rotor including a plurality of equally spaced scoop members, a shroud encompassing said rotor and scoop members and having a substantially tangential discharge chute extending therefrom, each scoop having its rear edge lying in a plane extending longitudinally of said rotor and radial thereto and the entire body of each scoop lying on one side of such radial plane, each scoop being of substantially uniform cross section throughout and being of semi-cylindrical shape starting from the rear edge thereof and extending throughout the major portion and terminating in a flat tangential portion adjacent its leading edge with the leading edge terminating in spaced relation to said radial plane and lying on the same side of such radial plane as the body of the scoop, so that forward motion of the snow plow and the rotary motion of the rotor combine with the cylindrically curved surface of each scoop and the centrifugal force produced on the snow by the rotation of each scoop to produce a diagonally transverse scouring action across the curved snow-engaging surface of each scoop to accelerate the speed at which the snow is discharged substantially above the speed at which the scoops are rotated.

References Cited in the file of this patent
UNITED STATES PATENTS

| | | |
|---|---|---|
| 1,334,516 | Brueggeman | Mar. 23, 1920 |
| 1,848,554 | Smith et al. | Mar. 8, 1932 |
| 1,987,313 | Severson | Jan. 8, 1935 |
| 2,198,407 | Brun | Apr. 30, 1940 |
| 2,555,948 | Wallack | June 5, 1951 |
| 2,650,439 | Hickman | Sept. 1, 1953 |